Dec. 30, 1969     ATSUMI NISHIMURA     3,486,543

FEED ROLLER ASSEMBLY FOR PLANING AND MOULDING MACHINE

Filed Sept. 6, 1967     3 Sheets-Sheet 1

ATSUMI NISHIMURA
INVENTOR.

BY *Wenderoth, Lind and Ponack, Attorneys*

Dec. 30, 1969  ATSUMI NISHIMURA  3,486,543
FEED ROLLER ASSEMBLY FOR PLANING AND MOULDING MACHINE
Filed Sept. 6, 1967  3 Sheets-Sheet 3

ATSUMI NISHIMURA,
INVENTOR.

BY Wendroth, Lind
and Ponack. Attorneys

United States Patent Office 3,486,543
Patented Dec. 30, 1969

3,486,543
FEED ROLLER ASSEMBLY FOR PLANING AND MOULDING MACHINE
Atsumi Nishimura, 2074 Mukojima, Okawa, Japan
Filed Sept. 6, 1967, Ser. No. 665,777
Int. Cl. B27b *31/00;* B27c *1/12*
U.S. Cl. 144—250                                    8 Claims

ABSTRACT OF THE DISCLOSURE

A plurality of feed rollers of a common outside diameter are rigidly mounted in their juxtaposed relationship on a rotary shaft. Each roller comprises an axle fitted onto the shaft, a hub of soft rubber fitted onto the axle, a rim including an internal metallic ring and an external ring of hard rubber united together into a unitary structure, and a plurality of spokes of soft rubber curved or straight in the generally radial direction and extending at equal angular intervals approximately tangentially from the hub to the internal rim ring. The external ring has an outer rough peripheral surface. A pair of roller assemblies as above described are disposed above a working table on the incoming and outcoming sides of a planing roller so as to push a wooden workpiece or workpieces against the table under a very low pressure while they rotate in a feeding direction, to feed the workpiece or workpieces for planing purpose. If desired, the hub and internal rim ring may be omitted.

---

This invention relates to improvements in a feed roller assembly for feeding wooden workpieces in a planing and moulding machine.

An object of the invention is to provide a new and improved feed roller assembly for use in a planing and moulding machine simultaneously to feed a plurality of wooden workpieces slightly different in thickness from one another to ensure that the workpieces are planed.

Another object of the invention to provide a new and improved feed roller assembly for use in a planing and moulding machine to feed a relatively wide wooden workpiece even though it would be twisted crosswise or greatly curved lengthwise on the leading and tailing end portions to ensure that that surface to be worked of the workpiece is planed in a plain surface without any deformation of the workpiece.

Still another object of the invention is to provide a new and improved feed roller assembly for use in a planing and moulding machine to feed a wooden workpiece as sawn to permit the sawn surface thereof to be planed into a plain surface.

Briefly, the invention accomplished the above cited objects by the provision of a feed roller assembly for use in a planing and moulding machine to feed a wooden workpiece through the latter, comprising a rotary shaft and a plurality of composite feed rollers having a common outside diameter and fixedly mounted in their juxtaposed relationship on the rotary shaft, each of the composite feed rollers including an axle member fitted onto the rotary shaft, a rim member of hard rubber material normally disposed concentrically with the axis of the rotary shaft and having an outer rough peripheral surface, and a plurality of spoke members of soft rubber material curved or straight in the generally radial direction of the axis of the rotary shaft and extending at substantially equal angular intervals approximately tangentially from the axle member to the rim member.

Preferably a hub member of soft rubber material may be fitted onto the axle member and the rim member may be lined with a metallic ring with the spoke member extending from the hub member to the metallic ring in the manner as above described.

Conveniently, the axle member may be provided on both end faces with teeth adapted to mesh the corresponding teeth on each end face of the adjacent axle member. If desired, the rollers may be keyed on the rotary shaft.

Advantageously a space confined by any pair of the adjacent spoke members may have the innermost and outermost ends round.

The invention will become more readily apparent from the following detailed description taken in conjunction with the accompanying drawings in which.

Figure 1:
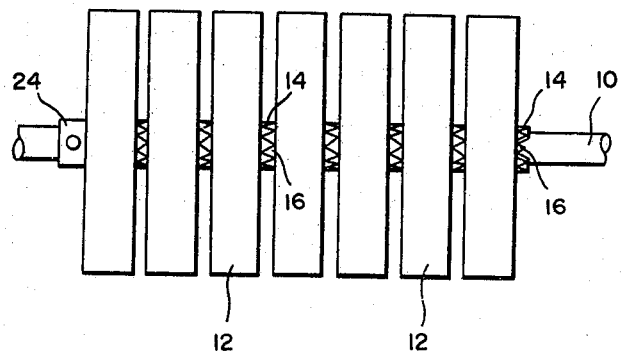
FIGURE 1 is a side elevational view of a roller assembly constructed in accordance with the teachings of the invention.
Figure 3:
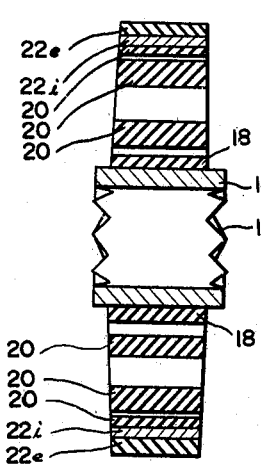
FIGURE 3 is a sectional view taken along the line III—III of FIGURE 2.
Figure 2:
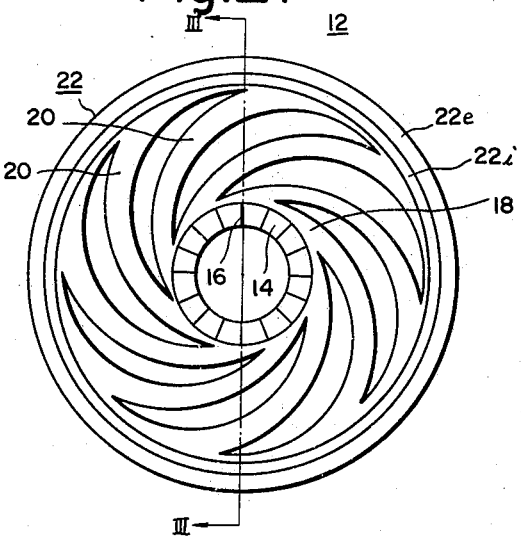
FIGURE 2 is a front elevational view of one roller illustrated in FIGURE 1.

Referring now to the drawings and FIGURES 1 through 3 in particular there is illustrated a feed roller assembly for use in a planing and moulding machine constructed in accordance with the teachings of the invention. An arrangement illustrated comprises a rotary shaft 10 operatively coupled at one end to a driving mechanism (not shown) to effect rotational movement in a predetermined direction. Fixedly mounted on the rotary shaft 10 are a plurality of composite feed rollers 12 disposed in their juxtaposed relationship. The rollers 12 have a common outside diameter and are of the same construction. Therefore only one of the rollers 12 will now be described in detail.

As best shown in FIGURES 2 and 3, the roller generally designated by the reference numeral 12 includes an axle member 14 adapted to be fitted onto the rotary shaft 10, and provided on both end faces with teeth 16, 16 capable of meshing the corresponding teeth on the end face of the adjacent axle member. The axle member 14 may be composed of a single hollow cylinder or a plurality of segments united into a single cylindrical tube. Firmly fitted on the axle member 14 is a hub member 18 of any suitable soft rubber material such as natural rubber or a synthetic rubber for example, neoprene (trademark), acrylonitrile rubber or butyl rubber, or polyurethane elastomer. A plurality of spoke member 20 of the same material as that of the hub member, extend at substantially equal angular intervals approximately tangentially from the periphery of the hub member 18 and curved in the generally radial direction until they terminate approximately tangentially at the internal periphery of composite rim member 22. The composite rim member is disposed concentrically with the axis of the axle member comprises an internal ring portion 22$i$ of any suitably metallic member such as steel, and an external ring portion 22$e$ of any suitable hard rubber material united together into a unitary structure. Suitable examples of the material for the external ring portion 22$e$ involve natural rubber, synthetic rubber such as neoprene (trademark), acrylonitrile rubber, butyl rubber and polyurethane elastomer and the like. The external ring portion 22$e$ may have an outer rough surface in order to increase a friction between the same and the mating surface of a workpiece.

In order to rigidly mount any desired number of the feed rollers 12 as above described on the rotary shaft 10, a retaining ring 24 having one end face complementary in configuration to the end axle face of the roller is rigidly secured on one end portion, in this example, the lefthand end portion as viewed in FIGURE 1 of the shaft 10 with that one end face directed toward the other end of the shaft. Then a first one of the feed rollers 12 is fitted onto the shaft 10 so as to abut against the retaining ring 24 and the remaining rollers are successively fitted onto the shaft until all the rollers are put in their juxtaposed relationship. Thereafter the last roller is fixed on the shaft by any suitable fastening means (not shown). Thus the feed roller assembly has been completed.

While the invention is applicable to a wide variety of planing and moulding machines the same will now be illustratively described in conjunction with a hand feed planer. A pair of feed roller assemblies as previously described are suitably disposed above a working table of a hand feed planer (not shown) on the incoming and outcoming sides of a planing roll (not shown) and put in rotationed movement in a direction opposite to the direction in which the spokes extend forward the rim. When a wooden workpiece is manually fed along the working planer table both the roller assemblies will apply to it a very low pressure by any suitable means (not shown) while they feed the workpiece until the planed workpiece is discharged from the planer.

In order to permit a plurality of wooden workpieces slightly different in height or thickness from one another to be simultaneously fed in their juxtaposed relationship along the working table of the planer, the feed rollers are maintained at their positions where a distance between the lowermost point on the outer periphery of each roller and the working table is substantially equal to the height or thickness of the lowest one of the workpieces.

Figure 4:
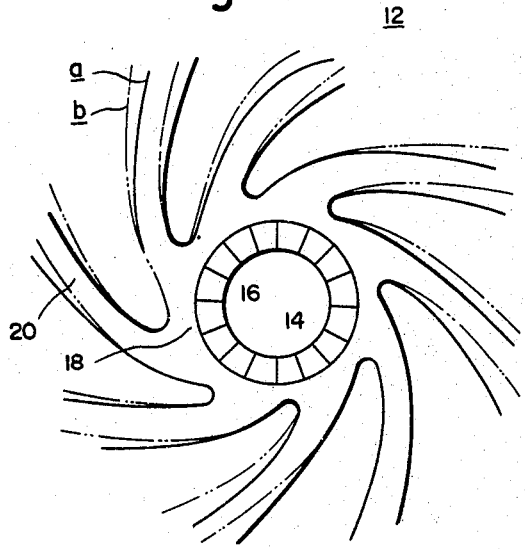
FIGURE 4 is a fragmental front elevational view in enlarged scale of the roller useful in explaining the operation of the invention.

Assuming that the present feed roller assembly rotating in the counterclockwise direction as viewed in FIGURE 4 is feeding a plurality of wooden workpieces slightly different in thickness from one another in their juxtaposed relationship, its operation will now be described in conjunction with FIGURE 4. Under these circumstances, it will be seen that the spoke members 20 of the particular roller 12 contacting the lowest workpiece (not shown) are in their position as illustrated at solid line $a$ in FIGURE 4 with the rotating external ring portion 22e of hard rubber maintained concentric with the axis of the rotary shaft 10. However for any of the feed rollers 12 engaging the particular workpiece even somewhat greater in thickness than the lowest one, the composite rim member 22 is correspondingly raised to its position eccentric with respect to the axis of the rotary shaft 10. Therefore each of spoke members 20 of that roller has its root portion near the hub member 18 maintained in its curved shape approximating its original shape and its other end portion remote from the hub member tending to be deformed into its approximately rectinlinear shape as shown at dot-and-dash line $b$ in FIGURE 4. Thus the roller or rollers including the spoke members 20 thus deformed continues or continue to be rotated while being maintained eccentrically with respect to the axis of the rotating shaft 10. This ensures that the rollers 12 continue to apply to the workpieces a predetermined very low pressure regardless of the thickness of the workpieces to be planed with the result that the workpieces lightly different in thickness from one another have those faces thereof opposite to the rollers having been planed by the associated planing roll. It is to be understood that the greater the thickness of the workpiece, the more the deformation of the spoke members of the associated roller from their original shape as illustrated at solid line $a$ to their changed shape as illustrated at dot-and-dash line $b$ in FIGURE 4, Also for a wide wooden workpiece either twisted laterally on both leading and tailing end portions or greatly curved lengthwise on such end portions, the outer rough peripheral surface of the hard rubber rim portion 22e lightly contacts its upper surface while the spoke members are correspondingly deformed in the manner as above described ensuring that such a workpiece is fed on the associated planing roll to be planed into a plain surface. This is true in the case of any sawn surface of a wooden workpiece.

Figure 5:
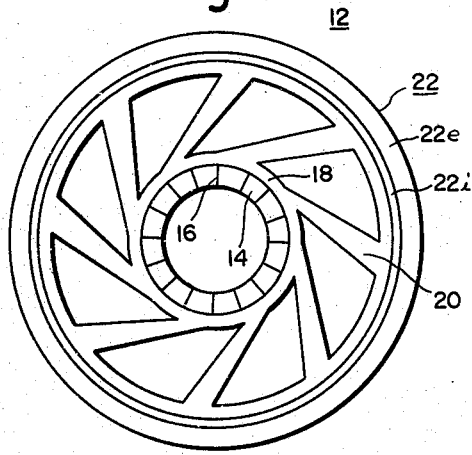
FIGURES 5, 6 and 7 are front elevational views of various modifications of the invention.

While the invention has been described in terms of the spoke members curved in the generally radial direction of the axis of the shaft 10 they may be straight in such a direction as shown in FIGURE 5 wherein the same reference numerals designate the components corresponding to those illustrated in FIGURES 2 and 3. In this case the spoke members 20 terminate at angles to the internal rim portion 22i.

Figure 6:
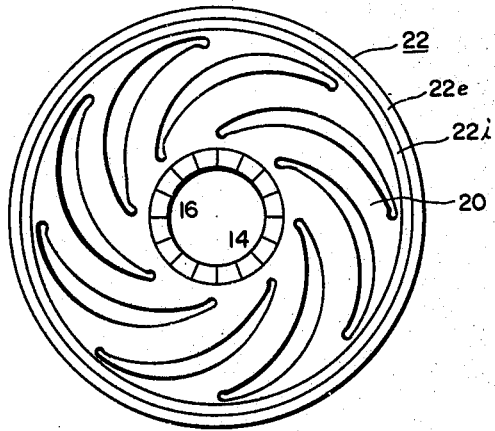

An arrangement shown in FIGURE 6 is substantially similar to that illustrated in FIGURES 2 and 3 except for a spacing defined by any pair of adjacent spoke members has both ends round. In FIGURE 6, the components corresponding to those illustrated in FIGURES 2 and 3 are designated by the same reference numerals used in the latter figures.

Figure 8:
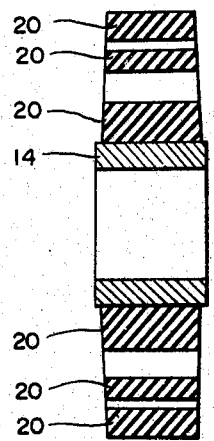
FIGURE 8 is a sectional view taken along the line VIII—VIII of FIGURE 7.
Figure 7:
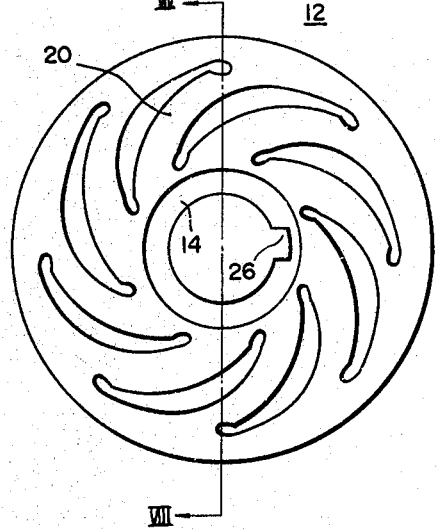

Referring now to FIGURES 7 and 8 of the drawings wherein the same reference numerals designate the components corresponding to those shown in FIGURES 2 and 3, there is illustrated another embodiment of the invention. In FIGURES 7 and 8 it is seen that the hub member 18 and the internal metallic ring portion of the rim member 22 are omitted and that the axle member 14 is provided with a key groove 26 rather than the toothed end faces for purpose of mounting it on the rotary shaft. Further any spacing between any pair of adjacent spoke members 20 has both ends round as in the embodiment shown in FIGURE 6.

Figure 9:
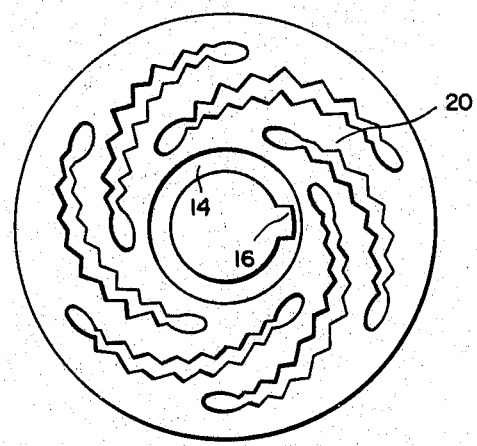
FIGURE 9 is a front elevational view of another modification of the invention.

FIGURE 9 wherein the same reference numerals designate the components corresponding to those illustrated in FIGURES 2 and 3 shows a feed roller similar to that illustrated in FIGURES 7 and 8 except for a spacing between any pair of adjacent spoke members 20 having a pair of opposed sides serrated.

While the invention has been illustrated and described in conjunction with certain preferred embodiments thereof it is to be understood that various changes and modification may be resorted to without departing from the spirit and scope of the invention.

What I claim is:

1. A feed roller assembly for use with a planing and moulding machine comprising a rotary shaft, a plurality of composite feed rollers having a common outside diameter and rigidly mounted in juxtaposed relationship on said rotary shaft, each of said composite feed rollers including an axle member fitted onto said rotary shaft, at least one of said axle members being wider than the feed roller mounted thereon and having each end face provided with means for rigidly engaging similar means on two adjacent feed rollers, whereby said feed rollers are spaced apart and roll together, a hub member of soft rubber material fitted onto said axle member, a rim member normally disposed concentrically with the axis of said rotary shaft and having an internal ring portion of metallic material and an external ring portion of hard rubber material united together into a unitary structure, said external ring portion having an outer rough surface, and a plurality of spoke members of soft rubber material disposed at substantially equal angular intervals and generally at an angle to a radius to said axis of said rotary shaft and extending substantially tangentially from said hub member and terminating at said internal ring portion, said spoke members being the only members connecting said hub member and said internal ring portion.

2. A feed roller assembly as claimed in claim 1, wherein said spoke members are curved in a generally spiral direction from said axis of said rotary shaft.

3. A feed roller assembly as claimed in claim 1, wherein said spoke members are straight and generally tangential to said hub member.

4. A feed roller assembly as claimed in claim 1, wherein said spoke members are curved in a generally spiral direction from said axis of said rotary shaft and the space between each pair of adjacent spoke members has both ends rounded.

5. A feed roller assembly for use with a planing and moulding machine comprising a rotary shaft, a plurality of composite feed rollers having a common outside diameter and rigidly mounted in juxtaposed relationship on said rotary shaft, each of said composite feed rollers including an axle member fitted onto said rotary shaft, at least one of said axle members being wider than the feed roller mounted thereon and having each end face provided with means for rigidly engaging similar means on two adjacent feed rollers, whereby said feed rollers are spaced apart and roll together, a rim member of hard rubber material normally disposed concentrically with the axis of said rotary shaft, and a plurality of spoke member of soft rubber material disposed at substantially equal angular intervals and generally at an angle to a radius to said axis of said rotary shaft and extending substantially tangentially from said axle member and terminating at said rim member, said spoke members being the only members connecting said axle member and said rim member.

6. A feed roller assembly as claimed in claim 5, wherein said spoke members are curved in a generally spiral direction from said axis of said rotary shaft.

7. A feed roller assembly as claimed in claim 5, wherein said spoke members are curved in a generally spiral direction from said axis of said rotary shaft and the space between each pair of adjacent spoke members has both ends rounded.

8. A feed roller assembly as claimed in claim 5, wherein said spoke members are curved in a generally spiral direction from said axis of said rotary shaft and the opposite sides of the spoke members are serrated.

References Cited

UNITED STATES PATENTS

| | | | |
|---|---|---|---|
| 501,004 | 7/1893 | Gleason | 144—250 |
| 1,749,393 | 3/1930 | Pflimlin | 29—128 X |
| 2,326,076 | 8/1943 | Solem | 144—250 |
| 2,374,194 | 4/1945 | Grupe | 29—125 X |
| 2,712,205 | 7/1955 | Valette | 29—125 |

FOREIGN PATENTS 1,100,735  9/1955  France.

GIL WEIDENFELD, Primary Examiner

U.S. Cl. X.R.

29—125, 132